(12) United States Patent
Fukasawa

(10) Patent No.: US 10,659,646 B2
(45) Date of Patent: May 19, 2020

(54) IMAGE FORMING APPARATUS CONFIGURED TO MANAGE STORAGE OF DOCUMENTS, CONTROL METHOD FOR THE SAME, STORAGE MEDIUM, AND DATA PROCESSING APPARATUS

(71) Applicant: CANON KABUSHIKI KAISHA, Tokyo (JP)

(72) Inventor: Nobuaki Fukasawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 19 days.

(21) Appl. No.: 15/598,863

(22) Filed: May 18, 2017

(65) Prior Publication Data
US 2017/0353619 A1    Dec. 7, 2017

(30) Foreign Application Priority Data
Jun. 6, 2016    (JP) .................................. 2016-112881

(51) Int. Cl.
*H04N 1/21*    (2006.01)
*H04N 1/00*    (2006.01)
*H04N 1/32*    (2006.01)

(52) U.S. Cl.
CPC ......... *H04N 1/2166* (2013.01); *H04N 1/0009* (2013.01); *H04N 1/00037* (2013.01); *H04N 1/00238* (2013.01); *H04N 1/00241* (2013.01); *H04N 1/00244* (2013.01); *H04N 1/00347* (2013.01); *H04N 1/32101* (2013.01)

(58) Field of Classification Search
None
See application file for complete search history.

(56) References Cited

U.S. PATENT DOCUMENTS

| | | | | |
|---|---|---|---|---|
| 2006/0132833 | A1* | 6/2006 | Terabe | H04N 1/00411 358/1.15 |
| 2008/0016090 | A1* | 1/2008 | Fukata | G06F 3/048 |

FOREIGN PATENT DOCUMENTS

| | | | |
|---|---|---|---|
| JP | 2000020368 A | | 1/2000 |
| JP | 2014021552 A | * | 2/2014 |

OTHER PUBLICATIONS

English transaltion of Yasuko et al., JP 2000-020368; Publication date Jan. 21, 2000.*

* cited by examiner

*Primary Examiner* — Mohammad H Ghayour
*Assistant Examiner* — Pawan Dhingra
(74) *Attorney, Agent, or Firm* — Rossi, Kimms & McDowell LLP

(57) ABSTRACT

An image forming apparatus which can prevent from automatically deleting, without user's intention, a box document restored from another image forming apparatus. A document storage deadline is set with respect to a folder thereof for storing box documents so as to set, as a target to be deleted from the folder, a box document having been stored in the folder over the document storage deadline. When it is determined that one of the box documents stored in the folder is a restored document, the one of the box documents is controlled to be excluded from the target.

4 Claims, 11 Drawing Sheets

*FIG. 7*

| | 700 | 711 | 713 | 712 |
|---|---|---|---|---|
| 710 | FOLDER 00 | DOCUMENT STORAGE DEADLINE | | THREE DAYS |
| | | OTHER SETTING | | |
| 720 | FOLDER 01 | DOCUMENT STORAGE DEADLINE | | INDEFINITE |
| | | OTHER SETTING | | |
| | | | | |
| | | | | |
| | | | | |

*FIG. 8*

| | NAME OF BOX DOCUMENT | GENERATION DATE/TIME | FOLDER | |
|---|---|---|---|---|
| 810 | File00 | 2015.11.06.10.20.12 | FOLDER 00 | |
| 820 | File10 | 2015.11.02.14.12.25 | FOLDER 01 | |
| 830 | File01 | 2015.06.22.09.02.01 | FOLDER 02 | |
| 840 | File02 | 2013.05.22.18.20.10 | FOLDER 03 | |
| | | | | |
| | | | | |

*FIG. 9*

| FOLDER 00 | NAME OF BOX DOCUMENT | GENERATION DATE/TIME | TYPE | |
|---|---|---|---|---|
| 910 | FileA | 2015.11.30.09.08.25 | PDL | |
| 920 | FileB | 2015.11.30.13.52.01 | SCAN | |
| 930 | File00 | 2015.11.06.10.20.12 | RESTORE | |
| 940 | File01 | 2015.06.22.09.02.01 | RESTORE | |
| 950 | File02 | 2013.05.22.18.20.10 | RESTORE | |
| | | | | |

IMAGE FORMING APPARATUS CONFIGURED TO MANAGE STORAGE OF DOCUMENTS, CONTROL METHOD FOR THE SAME, STORAGE MEDIUM, AND DATA PROCESSING APPARATUS

BACKGROUND OF THE INVENTION

Field of the Invention

The present invention relates to an image forming apparatus, a control method for the image forming apparatus, a storage medium, and data processing apparatus and especially relates to an image forming apparatus to back up and restore a box document, a control method for the image forming apparatus, a storage medium, and data processing apparatus.

Description of the Related Art

Some image forming apparatuses have a function (hereinafter called a "box function") to store document data acquired by scanning and document data imported from the outside. To take over the document data (hereinafter called a "box document") stored in a currently using image forming apparatus to a new image forming apparatus, the box document is conventionally backed up and restored. Here, "backup" indicates that a box document is moved from a currently using image forming apparatus to a specified storage destination such as a server, and "restore" indicates that a backup box document is moved from the specified storage destination to a new image forming apparatus. Further, when a box document is deleted by mistake after backup, a method for restoring the box document is proposed (see Japanese Laid-Open Patent Publication (kokai) No. 2000-20368).

However, a conventional restoring technique is not involved in the setting of a box function (called a box setting) in an image forming apparatus which restores a box document. This box setting often includes a storage deadline. For example, there is a case where a storage deadline was set to be indefinite at an image forming apparatus where the box document was once backed up, while a storage deadline is still set to a default value (for example, a storage deadline of three days) at an image forming apparatus where the box document has been restored. In this case, a box document is sometimes unintentionally deleted even if a user simply backs up or restores the box document. Japanese Laid-Open Patent Publication (kokai) No. 2000-20368 proposes a method to restore, without using a large region, a box document which has been incorrectly deleted. However, it takes time to restore the box document if the box document is incorrectly deleted, and therefore it is preferable to prevent such an incorrect deletion.

SUMMARY OF THE INVENTION

The present invention provides an image forming apparatus which can prevent from automatically deleting, without user's intention, a box document restored from another image forming apparatus, and a control method for the image forming apparatus, a storage medium, and data processing apparatus.

To achieve the above-described object, according to a first aspect in the preset invention, there is provided an image forming apparatus having a folder for storing box documents, comprising a restore unit configured to acquire a box document held in an external device for backup and store the box document in the folder as a restored document, a first setting unit configured to set a document storage deadline with respect to the folder, a second setting unit configured to set, as a target to be deleted from the folder, a box document having been stored in the folder over the document storage deadline among the box documents, a determination unit configured to determine whether one of the box documents stored in the folder is the restored document, and a control unit configured to control based on a determination result by the determination unit whether to exclude the one of the box documents stored in the folder from the target to be deleted.

To achieve the above-described object, according to a second aspect in the preset invention, there is provided a data processing apparatus comprising a restore unit configured to acquire data stored in an external device and restore the data in a folder, a setting unit configured to set a data storage deadline with respect to the folder, and a control unit configured to control not to delete the data restored by said restore unit, which has been stored in the folder over the set data storage deadline.

The present invention can prevent from automatically deleting, without user's intention, a box document restored from another image forming apparatus.

Further features of the present invention will become apparent from the following description of exemplary embodiments (with reference to the attached drawings).

BRIEF DESCRIPTION OF THE DRAWINGS

FIG. 7 is a table showing an example of a setting regarding a document storage deadline by a storage deadline setting unit of a setting holding control unit shown in FIG. 3.

FIG. 8 is a document management table to be acquired from a server shown in FIG. 2 when a document backup restore control unit shown in FIG. 3 restores document backup data.

FIG. 9 is a document management table to manage box documents for respective folders, which is used in a document storage control unit shown in FIG. 3.

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

Figure 1:
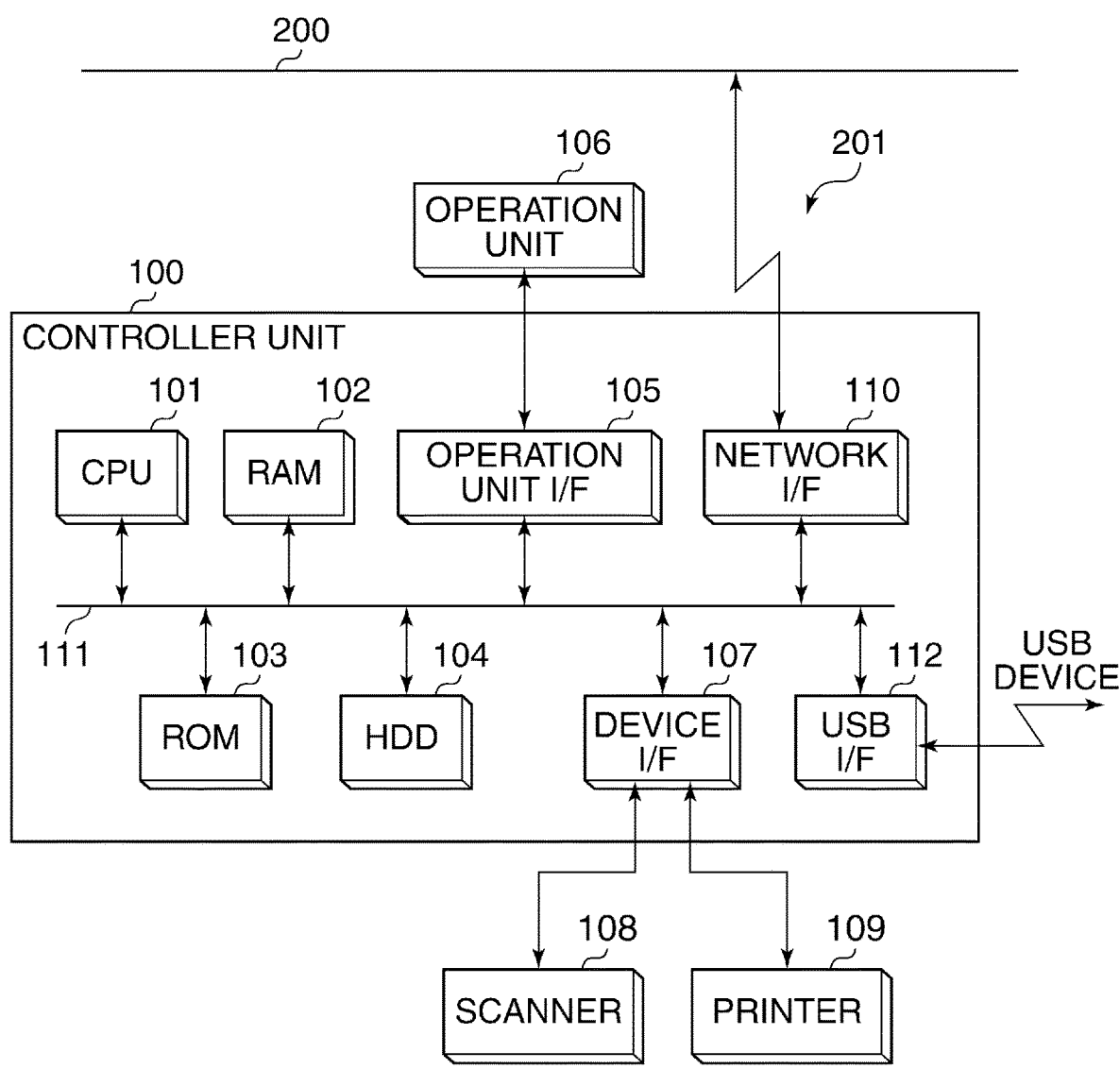
FIG. 1 is a block diagram showing a hardware configuration of an image forming apparatus as an embodiment of the present invention.

FIG. 1 is a block diagram showing a hardware configuration of an image forming apparatus as an embodiment of the present invention. Here, a hardware configuration of an image forming apparatus 201 will be described with reference to FIG. 1. However, image forming apparatuses 202 and 203 shown in FIG. 2 to be described later also have a similar hardware configuration.

In FIG. 1, a controller unit is denoted by 100. The controller unit 100 controls the image forming apparatus 201. A CPU 101 is a computation device to totally control the controller unit 100. A system bus 111 is connected to a CPU 101, a RAM 102, a ROM 103, a HDD 104, an operation unit I/F 105, a device I/F 107, a network I/F 110, and a USB I/F 112. The CPU 101 integrally controls each of the devices connected to the system bus 111. The RAM 102 is a system work memory for the CPU 101 to operate and is an image memory to temporarily store image data. Further, the RAM 102 stores programs and data of such as an operating system, system software, and application software. The ROM 103 stores a boot program of the controller unit 100. Further, the ROM 103 may store a system program and an application program and may store information necessary for the image forming apparatus 201 such as fonts. The HDD 104 is a hard disk drive and stores such as an operation system, a system software, an application software, document data, image data, and setting data. A program stored in the RAM 102 is executed by the CPU 101 and executes image data and other data which are stored in the RAM 102, the ROM 103, and the HDD 104. In addition, in the case of downsizing the image forming apparatus 201, the image forming apparatus 201 may not have the HDD 104 and sometimes uses a flash memory such as a solid state disk (SSD) or the like instead of the HDD 104. In that case, system software, application software, etc. can be stored in the ROM 103 or the like.

The controller unit 100 includes an operation unit I/F 105, a device I/F 107, a network I/F 110, and a USB I/F 112. The operation unit I/F 105 is connected to an operation unit 106. The operation unit 106 is a unit to operate the image forming apparatus 201 with such as a display device including a touch panel which notifies a state of the image forming apparatus 201 and receives an operation from a user and an operation button to provide an instruction to the image forming apparatus 201. The device I/F 107 connects a scanner 108 and a printer 109 which are an image input/output device with the controller unit 100 to input and output image data. Image data input from the scanner 108 via the device I/F 107 is stored in the RAM 102 and the HDD 104. Image processing is performed to the stored image data by an application program stored in the RAM 102 as needed. Further, similarly in the case where image data is input, the image data is output to the printer 109 via the device I/F 107. The network I/F 110 is connected to a LAN 200 and inputs/outputs document data and image data of an external device on network, or information to control the image forming apparatus 201. The USB I/F 112 mounts an external memory such as a flash memory card and reads out data stored therein and prints the data by the printer 109. Further, data scanned by the scanner 108 is stored in the mounted external memory.

It should be noted that a configuration, such as not having the scanner 108 and the printer 109 (i.e. a data processing apparatus), which is not shown in FIG. 1 may be included as long as effects of the present invention are satisfied. Further, in the case where the image forming apparatus 201 has a facsimile function, the controller unit 100 may include an I/F for a modem device which is not shown in FIG. 1, and the image forming apparatus 201 may be connected to a public network by a modem and transmit a facsimile.

Figure 2:
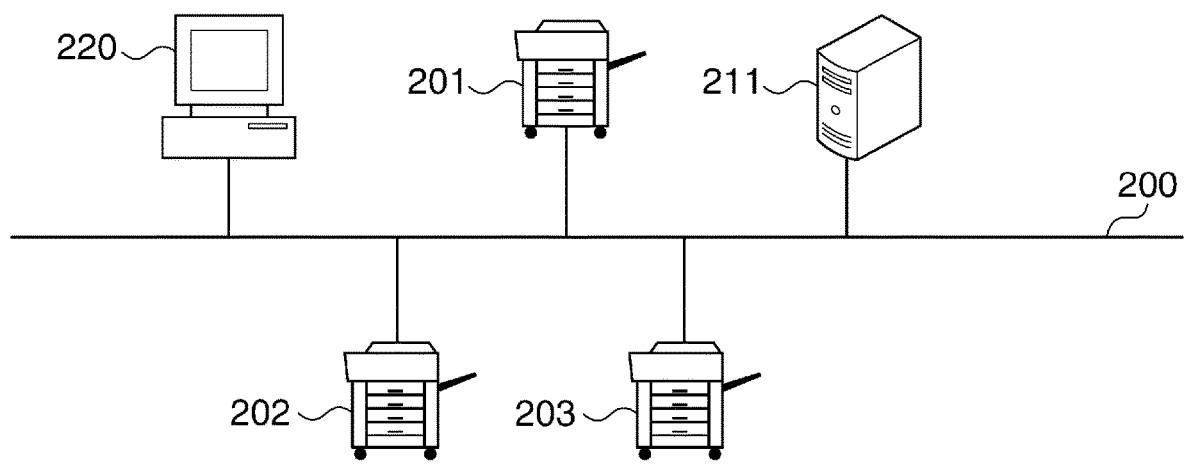
FIG. 2 is a diagram showing a system configuration, as an embodiment of the present invention, including the image forming apparatus shown in FIG. 1.

FIG. 2 is a diagram showing a system configuration, as an embodiment of the present invention, including the image forming apparatus 201 shown in FIG. 1.

In the system shown in FIG. 2, the LAN 200 is connected to a PC 220, a server 211, the image forming apparatuses 201, 202, and 203.

Among the image forming apparatuses 201, 202, and 203 included in this system, functions of the image forming apparatus 201 will be described below. However, the image forming apparatuses 202 and 203 also have similar functions.

To back up document data of the image forming apparatus 201, a user instructs backup to the image forming apparatus 201 by using a browser and an application which are operated by the PC 220. The instructed image forming apparatus 201 stores document data (hereinafter called a box document) stored in a document storage control unit 302 to be described later as document backup data to an instructed storage destination (e.g. an external device such as the server 211 shown in FIG. 2) via the LAN 200.

Similarly, to restore the box document in the image forming apparatus 201, a user instructs to restore the box document by using a browser and an application which are operated by the PC 220. Specifically, a user instructs to restore the box document to the image forming apparatus 201 by specifying a box document stored in the instructed storage destination (e.g. an external device such as the server 211 in FIG. 2) or a folder in which the box document is stored.

It should be noted that a method for restoring a box document is not limited to the above-described method. For example, when a box document is restored, a device to back up the box document may be specified from the image forming apparatuses 201 to 203 instead of specifying a box document and a folder of the above-described instructed storage destination. In this case, at the same time when a box document stored in the specified device is backed up, a box document stored outside is restored in the specified device. In addition, the backup box document is stored in an external memory such as a USB memory and restored by inserting the external memory in the device in which the box document is restored. The present invention is not limited by equipment used for backup and restoring and a method relevant to the equipment.

Figure 3:
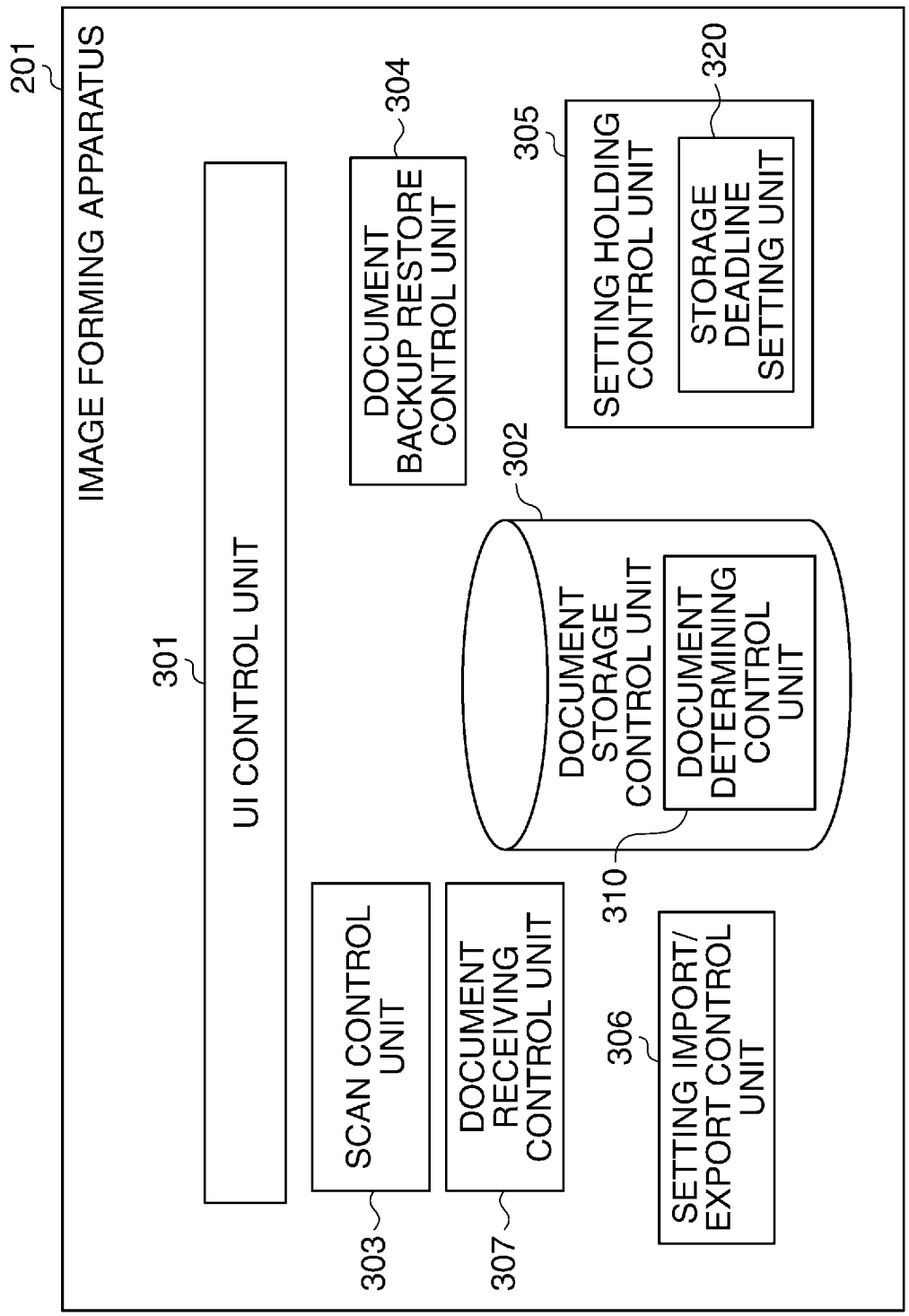
FIG. 3 is a block diagram showing a software configuration of the image forming apparatus shown in FIG. 1.

FIG. 3 is a block diagram showing a software configuration of the image forming apparatus 201 shown in FIG. 1. Each control unit indicated herein is operated by the CPU 101 of the image forming apparatus 201. Here, a software configuration of the image forming apparatus 201 will be described with reference to FIG. 3. However, the image forming apparatuses 202 and 203 also have a similar hardware configuration.

In FIG. 3, a UI control unit of the image forming apparatus 201 is denoted by 301. A document storage control unit is denoted by 302 and stores image data as a box document. A scan control unit which reads document data and generates image data is denoted by 303. The generated image data is passed to the document storage control unit 302 in response to an instruction from a user and stored as a box document. A document backup restore control unit is denoted by 304. The document backup restore control unit 304 performs a backup control and a restore control. In the backup control, a box document stored in the document storage control unit 302 is sent to the server 211 which is an external device. In the restore control, a box document stored in the server 211 for backup is acquired and stored in the document storage control unit 302. A setting holding control unit is denoted by 305 and stores setting values of the image forming apparatus 201. In each of the setting values, holding of information on a storage deadline of a box document is controlled by a storage deadline setting unit 320. A document determining control unit which is a part of the document storage control unit 302 is denoted by 310 and the document determining control unit 310 determines whether a box document stored therein is acquired by the restore control in the document backup restore control unit 304 or acquired by a method different from the restore control. A setting import/export control unit is denoted by 306. The setting import/export control unit 306 performs setting export control and setting import control. The setting export control is to extract a setting value held in the setting holding control unit 305 to the outside as setting export data. The setting import control is to fetch setting export data from the outside and restore a setting. A document receiving control unit is denoted by 307. The document receiving control unit 307 receives image data such as PDL data from the outside and performs image processing in response to user's instruction. The processing in response to the user's instruction includes printing, storing, and transferring the image data. When a user instructs to store the image data, the received image data is passed to the document storage control unit 302 as a box document and stored. It should be noted that, in the present embodiment, in the case where a stored box document is generated by the scan control unit 303 or received by the document receiving control unit 307, the document determining control unit 310 determines that the stored box document is acquired by a method different from a restore control.

Figure 4:
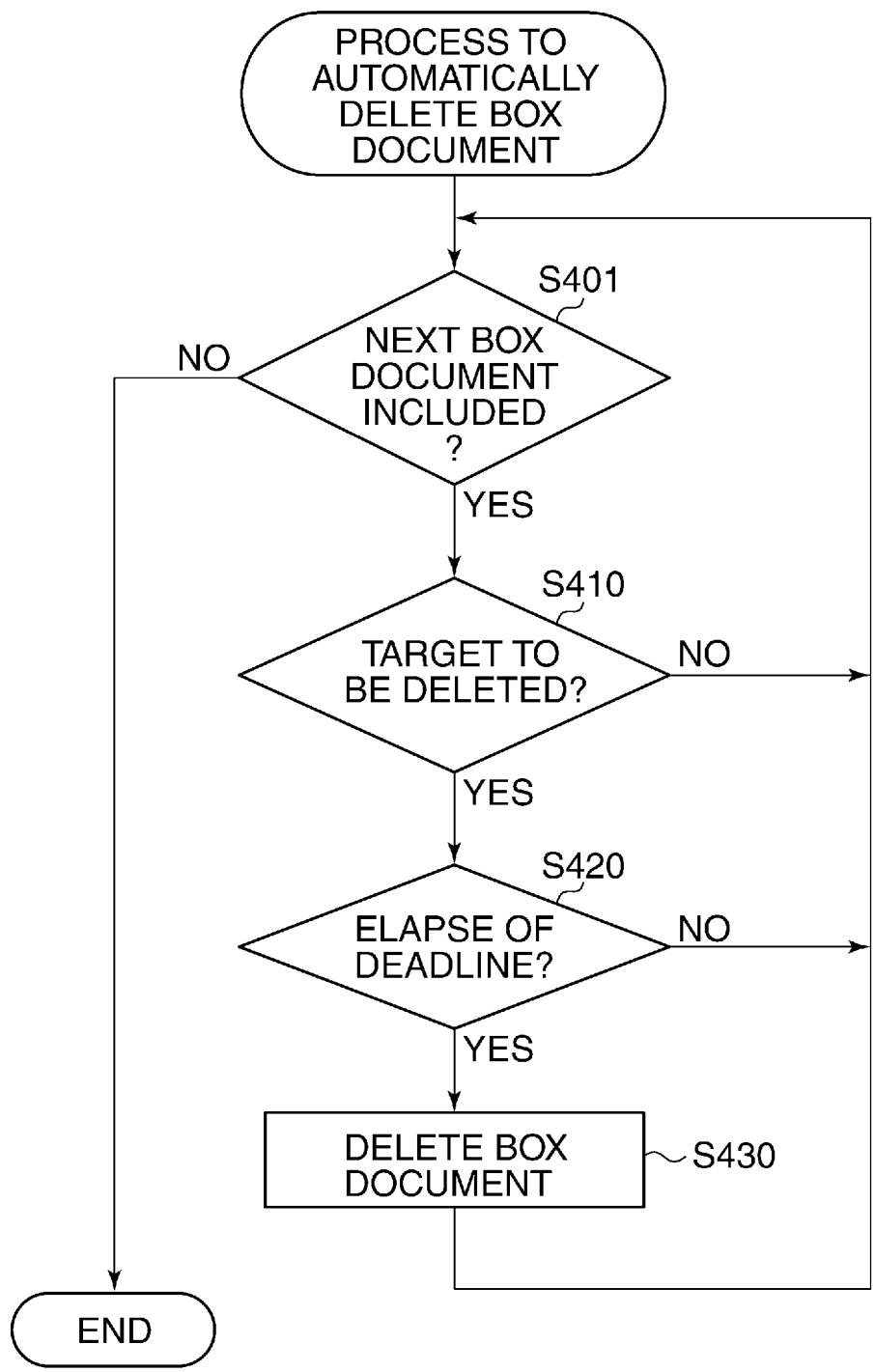
FIG. 4 is a flowchart showing an example procedure of a process to automatically delete a box document.
Figure 5:
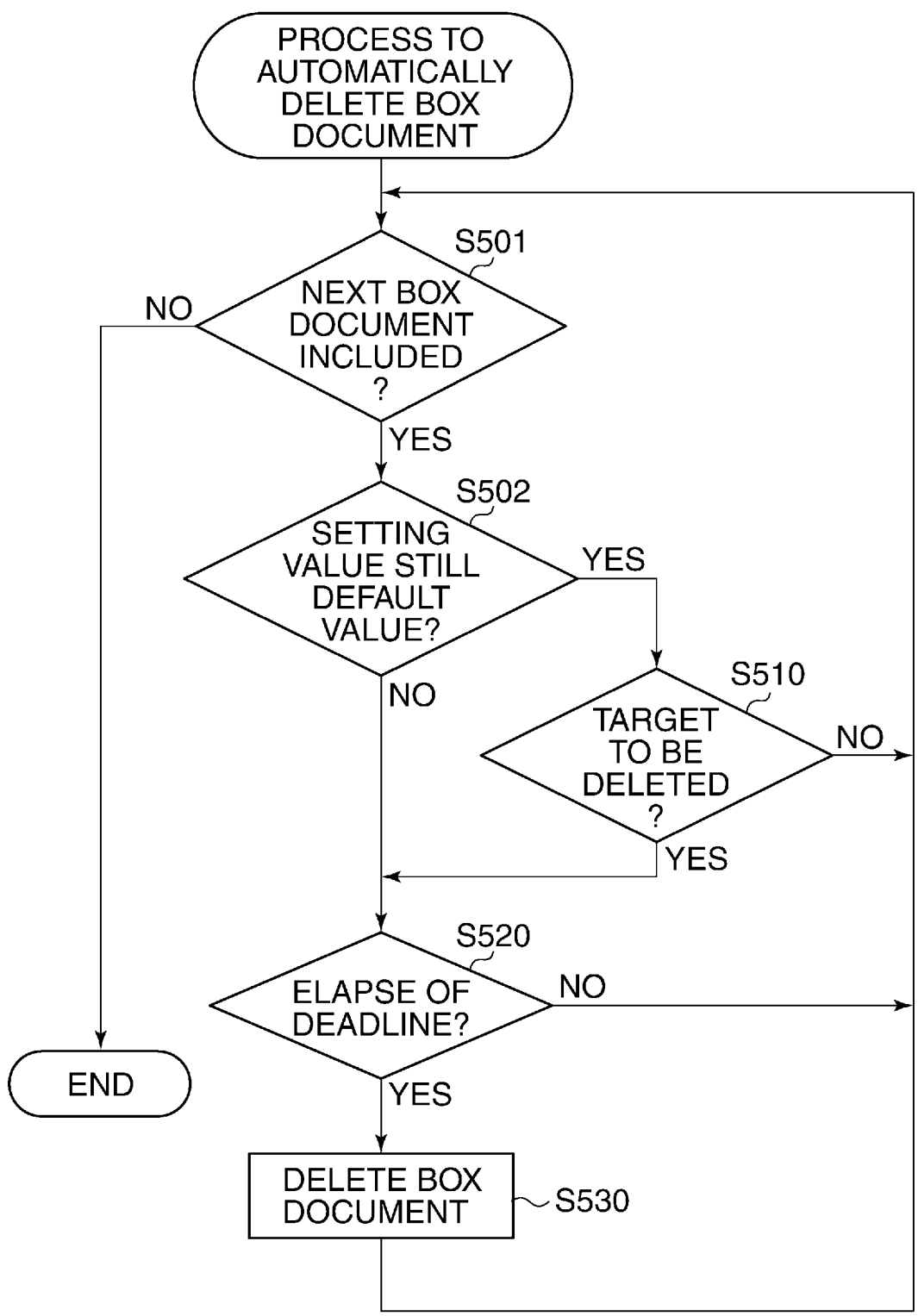
FIG. 5 is a flowchart showing an example procedure of a process to automatically delete a box document.
Figure 6:
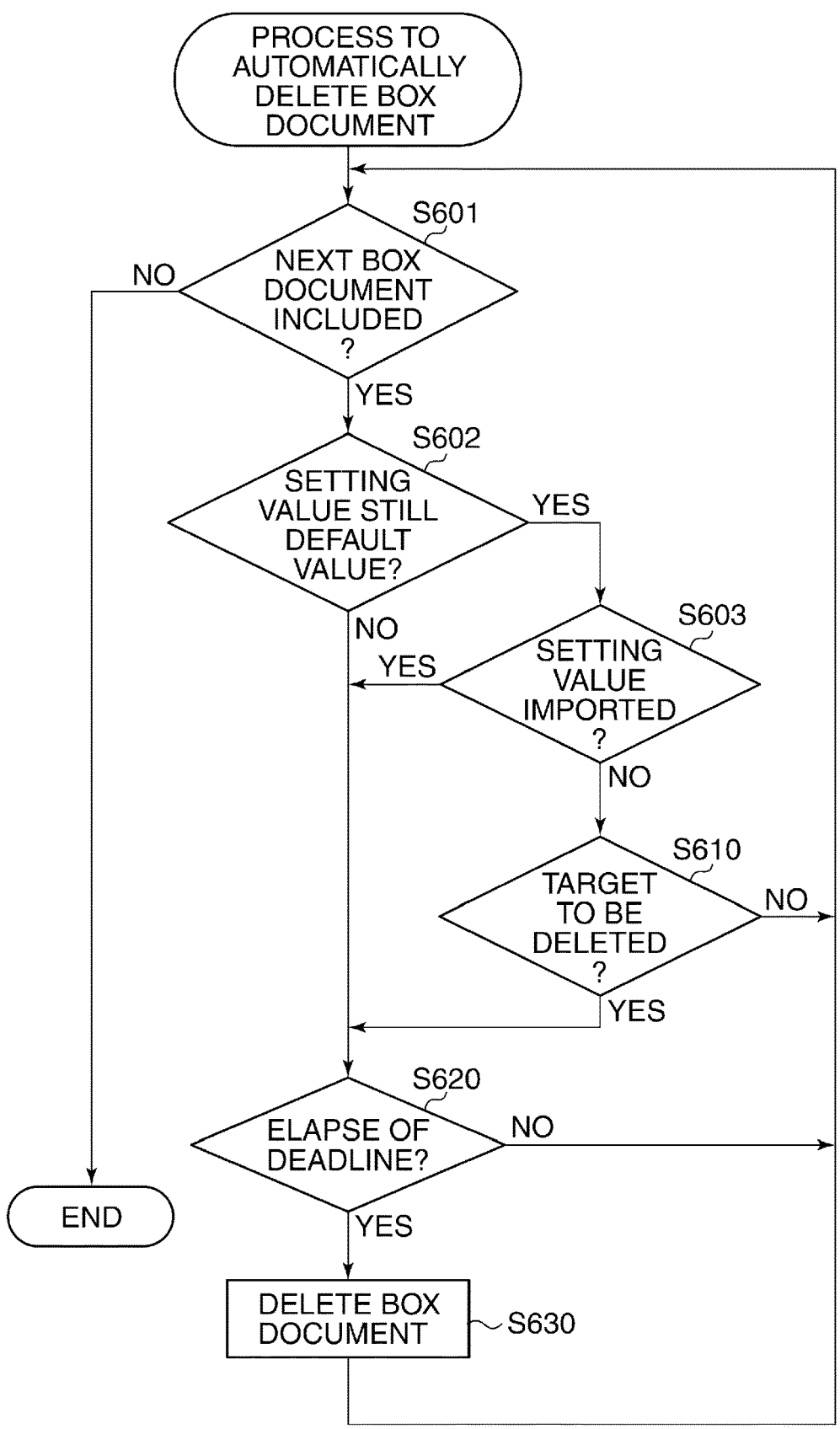
FIG. 6 is a flowchart showing an example procedure of a process to automatically delete a box document.

FIGS. 4 to 6 are flowcharts showing procedures for a process to automatically delete a box document, which is performed by the CPU 101 of the image forming apparatus 201.

FIG. 4 is a flowchart showing an example procedure of a process to automatically delete a box document.

It is determined that a folder managed in a table 700 in FIG. 7 to be described later includes a box document (hereinafter called "next box document") which is not yet determined whether it is a target to be deleted in step S410 to be described later in FIG. 4 (step S401). If the next box document is not included (No in step S401), the process is terminated. If the next box document is included (Yes in step S401), the process is moved to step S410.

In step S410, the document determining control unit 310 determines whether the next box document is a restored document. If the next box document is a restored document, the next box document is determined not to be a target to be deleted. If the next box document is other than a restored document, the next box document is determined to be the target to be deleted. Examples of a box document other than a restored document include a scan document acquired by scanning by the scanner 108 and a document to be printed which is input from the PC 220 arranged outside. As a result, if the box document is determined not to be the target to be deleted (No in step S410), the process is returned to step S401. If the box document is determined to be the target to be deleted (Yes in step S410), the process is moved to step S420.

It is determined in step S420 whether the box document determined to be the target to be deleted in step S410 has been stored in the document storage control unit 302 over a storage deadline. The storage deadline is held in the setting holding control unit 305 as a setting value of the image forming apparatus 201. As a result, if the storage deadline does not elapse (No in step S420), the process is returned to step S401. If the storage deadline elapses (Yes in step S420), the process moves to step S430. In step S430, the box document is deleted, and the process is returned to step S401. The process may be periodically performed by a timer and may be performed by other triggers. Further, a trigger to start the process is not limited in the present invention.

According to the process described in FIG. 4, a restored document is excluded from a target to be automatically deleted. Therefore, it is prevented that a box document is deleted against user's intention.

FIG. 5 is a flowchart showing an example procedure of a process to automatically delete a box document.

In FIG. 5, step S501 is similar to step S401 shown in FIG. 4. Therefore, a description will be omitted. If a next box document is not included (No in step S501), the process is terminated. If a next box document in included (Yes in step S501), the process is moved to step S502.

In step S502, it is determined whether a setting value of a storage deadline held in the setting holding control unit 305 is a default value (for example, a factory setting value). As a result of this determination, if the setting value is a default value (Yes in step S502), the process is moved to step S510. If the setting value is other than a default value (No in step S502), the process is moved to step S520. It should be noted that, in the embodiment, a table indicating whether a setting value of a storage deadline is a default value is held in the storage deadline setting unit 320, and a determination process in step S502 is performed based on this table. However, a method for this determination process is not limited to the above-described method. For example, this determination process may be performed based on a flag which indicates whether a setting value of a storage deadline is changed is included in each folder.

Processes in step S510, S520, and S530 are similar to processes in step S410, S420, and S430 in FIG. 4 respectively, and therefore descriptions will be omitted.

According to processes in FIG. 5, even if a box document is a restored document, if a user intentionally changes a setting value of a storage deadline from a default value, the restored document is included in a target to be automatically deleted. Consequently, a box document which is desired by a user to automatically delete can be certainly automatically deleted.

FIG. 6 is a flowchart showing an example procedure of a process to automatically delete a box document.

In FIG. 6, processes in steps S601 and S602 are similar to processes in steps S501 and S502 indicated in FIG. 5, and therefore descriptions will be omitted. As a result of a determination in step S602, if a setting value is a default value (Yes in step S602), the process is moved to step S603. If the setting value is other than a default value (No in step S602), the process is moved to step S620.

It is determined in step S603 whether a setting value of a storage deadline is imported by the setting import/export control unit 306. As a result of this determination, if the setting value is an imported value (Yes in step S603), the process is moved to step S620. If the setting value is not an imported value (No in step S603), the process is moved to step S610. This determination is performed based on imported information to be described with reference to FIG. 11. Processes in step S610, S620, and S630 are similar to processes in step S410, S420, and S430 indicated in FIG. 4 respectively, and therefore descriptions will be omitted.

According to processes in FIG. 6, in the case where a user intentionally sets a setting value of a storage deadline by importing the value, a restored document is included in a target to be automatically deleted even if the setting value is a default value. Consequently, a box document which is desired by a user to automatically delete can be certainly automatically deleted.

FIG. 7 is a table showing an example of a setting regarding a document storage deadline by the storage deadline setting unit 320 of the setting holding control unit 305 shown in FIG. 3.

In the table 700 in FIG. 7, a line 710 is a setting regarding a folder 00 among folders which store box documents. An item 711 is a setting of a document storage deadline of the folder 00, and an item 712 indicates a setting value thereof. In an example indicated in FIG. 7, a document storage deadline of the folder 00 is three days. Similarly, a line 720 indicates a setting value of a folder 01, and a document storage deadline is indefinite. Item 713 is the other setting of the folder 00, and details thereof is not within the scope of the present invention, and therefore a description will be omitted.

FIG. 8 is a document management table to be acquired from the server 211 shown in FIG. 2 when the document backup restore control unit 304 shown in FIG. 3 restores document backup data.

In FIG. 8, in a document management table 800, a line 801 stores a box document name, a line 802 stores a generation date/time of the box document, a line 803 stores a folder in which the box document is stored at backup, and a line 804 stores other information. For example, a line 810 indicates that a name of a box document is File00, a generation date/time of the box document is 10:20:12 on Nov. 6, 2015, and a folder storing the box document is Folder 00. Examples of the other information in the line 804 include a data size and a paper size of the box document. However, such information is not limited in the present invention and therefore not described in detail.

FIG. 9 is a document management table to manage box documents for respective folders, which is used in the document storage control unit 302 shown in FIG. 3.

In a document management table 900 in FIG. 9, a portion managing a box document stored in the folder 00 will be described. A line 901 stores a name of a box document, a line 902 stores a generation date/time of the box document, a line 903 stores a type of the box document, and a line 904 stores other information. For example, a line 910 indicates that a name of a box document is FileA, a generation date/time of the box document is 09:08:25 on Nov. 30, 2015, and a type of the box document is a PDL document. Similarly, a type of FileB is a scan document, and File00, File01, and File02 are restored documents. Box documents indicated in lines 930, 940, and 950 in FIG. 9 respectively correspond to box documents indicated in lines 810, 830, and 840 in the document management table 800 in FIG. 8. Therefore, a box document name and a generation date/time coincide with information on the corresponding box documents in the document management table 800.

Examples of the other information in the line 904 include a data size and a paper size of the box document. However, such information is not limited in the present invention and therefore not described in detail.

Figure 10:
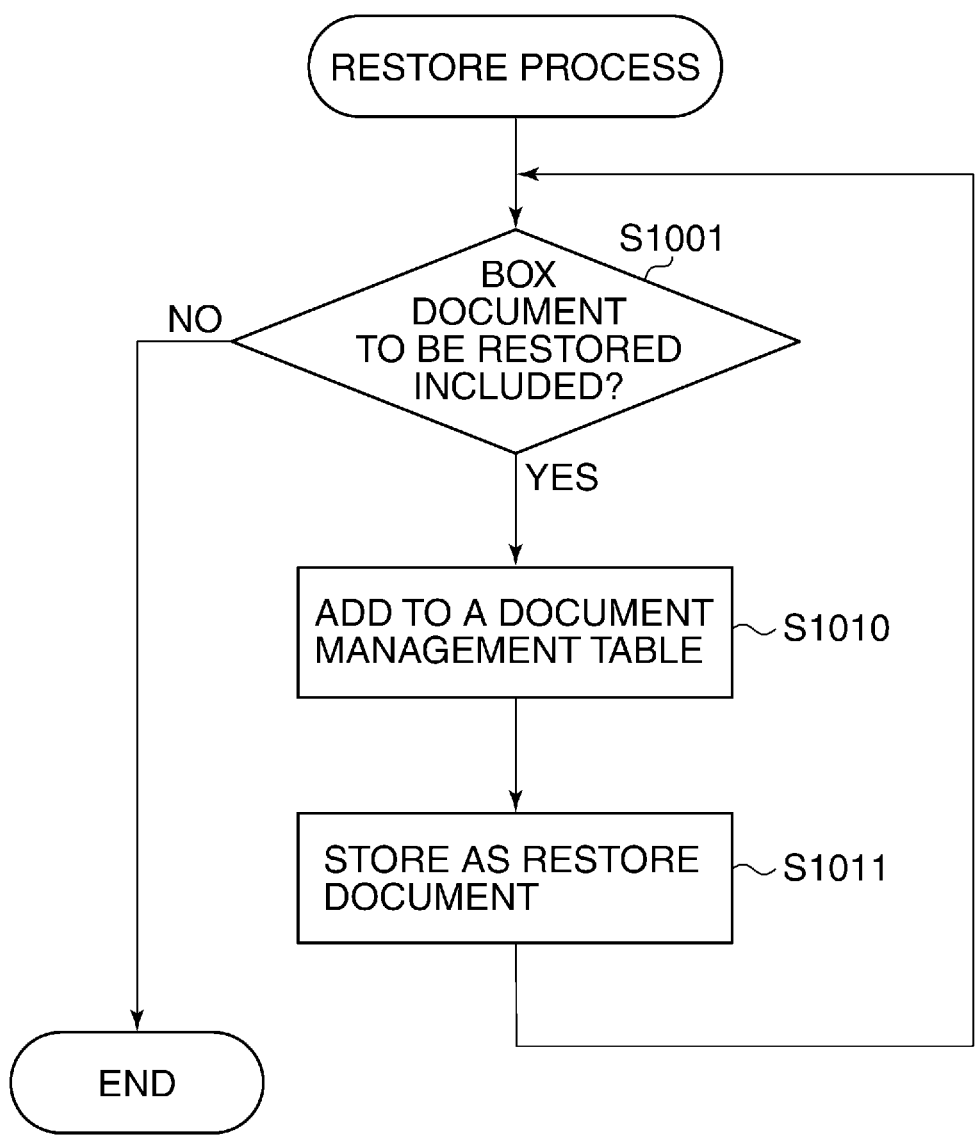
FIG. 10 is a flowchart showing an example procedure of a restore process.

FIG. 10 is a flowchart showing an example procedure of a restore process. This processing is performed by the CPU 101 of the image forming apparatus 201.

In FIG. 10, in step S1001, a document backup restore control unit 304 acquires the document management table 800 shown in FIG. 8 from the server 211, and it is determined whether there is a box document to be restored from the server 211. As a result of the determination, if there is a box document to be restored (Yes in step S1001), the process is moved to step S1010. If there is no box document to be restored (No in step S1001), the process is terminated. In step S1010, a line is added to the document management table 900 in FIG. 9. Specifically, information on a box document stored in the line 810 in FIG. 8 is added to a line 930 in FIG. 9. As a box document name, information in the line 801 in FIG. 8 is copied to the line 901 in FIG. 9. As a generation date/time, information in the line 802 in FIG. 8 is copied to the line 902 in FIG. 9, and since the box document is a restored document, the line 903 in FIG. 9 indicates "restore". Next, in step S1011, the document backup restore control unit 304 passes a box document restored from the server 211 to the document storage control unit 302 and stores the box document as a restored document. Then, the process is returned to step S1001, and this process is repeated.

Figure 11:
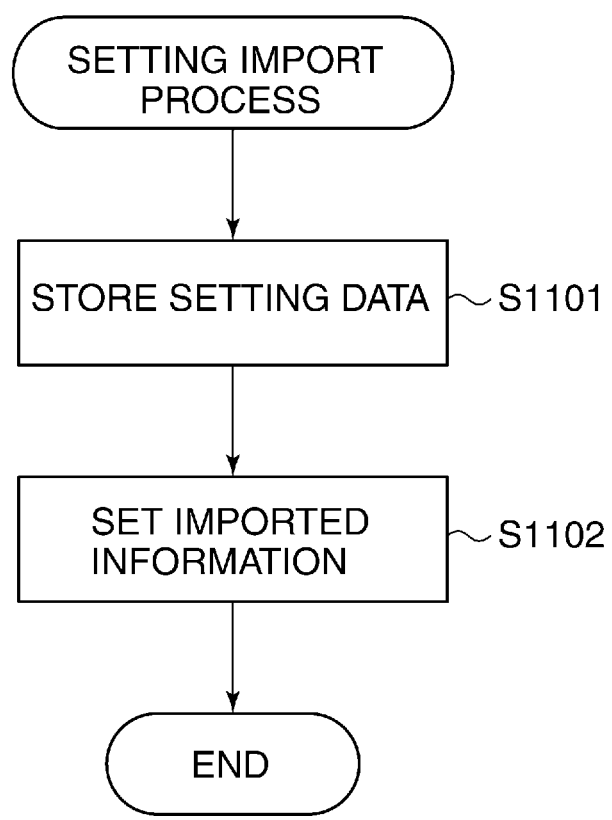
FIG. 11 is a flowchart showing an example procedure of a setting import process.

FIG. 11 is a flowchart showing an example procedure of a setting import process. This processing is performed by the CPU 101 of the image forming apparatus 201.

In step S1101, setting data imported from the outside by the setting import/export control unit 306 is passed to the document storage control unit 302 and stored as setting data of the image forming apparatus 201. Among setting data, a setting of a storage deadline is performed by the storage deadline setting unit 320. Then, in step S1102, information indicating that the setting data of the image forming apparatus 201 is generated based on imports (hereinafter called imported information) is set, and the process is terminated. The imported information is held in the setting holding control unit 305.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-112881, filed Jun. 6, 2016, which is hereby incorporated by reference herein in its entirety.

What is claimed is:

1. An image forming apparatus that manages a folder for storing one or more documents received from an external device, comprising:
   a memory storing instructions, and
   at least one processor electrically connected to the memory and executing the stored instructions to:
      set a document storage deadline of the folder, wherein the document storage deadline is a time period after which a target document stored in the folder is to be automatically deleted from the folder;
      manage information indicating whether the set document storage deadline is a default time period or has been changed from the default time period;
      acquire document data held in the external device for storage in the folder;
      store, as a restored document, the acquired document data in the folder managed by the image forming apparatus;
      in a case where the document storage deadline of the folder is the default time period, determine, based on the document storage deadline, the target document to be deleted from one or more documents stored in the folder but excluding the restored document stored in the folder, even though the document storage deadline of the folder indicates that the restored document may be deleted;
      in a case where the document storage deadline of the folder has been changed from the default time period, determine, based on the document storage deadline, the target document to be deleted from among all documents in the folder including the restored document stored in the folder; and
      delete the determined target document.

2. The image forming apparatus according to claim 1, wherein the instructions further cause the image forming apparatus to acquire a setting value of the document storage deadline from the outside, and
   determine, based on the acquired setting value, the target document from among all documents in the folder.

3. A control method for an image forming apparatus that manages a folder for storing one or more documents received from an external device and including a processor for executing the control method, the control method comprising:
   setting a document storage deadline of the folder, wherein the document storage deadline is a time period after which a target document stored in the folder is to be automatically deleted from the folder;
   managing information indicating whether the set document storage deadline is a default time period or has been changed from the default time period;
   acquiring document data held in the external device for storage in the folder;
   storing, as a restored document, the acquired document data in the folder managed by the image forming apparatus;
   in a case where the document storage deadline of the folder is the default time period, determining, based on the document storage deadline, the target document to be deleted from one or more documents stored in the folder but excluding the restored document stored in the folder, even though the document storage deadline of the folder indicates that the restored document may be deleted;
   in a case where the document storage deadline of the folder has been changed from the default time period, determining, based on the document storage deadline, the target document to be deleted from among all documents in the folder including the restored document stored in the folder; and
   deleting the determined target document.

4. A non-transitory computer-readable storage medium having stored therein a program for causing a computer to implement a method of controlling an image forming apparatus that manages a folder for storing one or more documents received from an external device and including a processor for executing the control method, the control method comprising:
   setting a document storage deadline of the folder, wherein the document storage deadline is a time period after which a target document stored in the folder is to be automatically deleted from the folder;
   managing information indicating whether the set document storage deadline is a default time period or has been changed from the default time period;
   acquiring document data held in the external device for storage in the folder;
   storing, as a restored document, the acquired document data in the folder managed by the image forming apparatus;
   in a case where the document storage deadline of the folder is the default time period, determining, based on the document storage deadline, the target document to be deleted from one or more documents stored in the folder but excluding the restored document stored in the folder, even though the document storage deadline of the folder indicates that the restored document may be deleted;
   in a case where the document storage deadline of the folder has been changed from the default time period, determining, based on the document storage deadline, the target document to be deleted from among all documents in the folder including the restored document stored in the folder; and
   deleting the determined target document.

* * * * *